June 8, 1965   W. F. FRIEDRICHSMEIER   3,187,436
CONTRASTING COLOR GUN SIGHT
Filed June 1, 1962   2 Sheets-Sheet 1
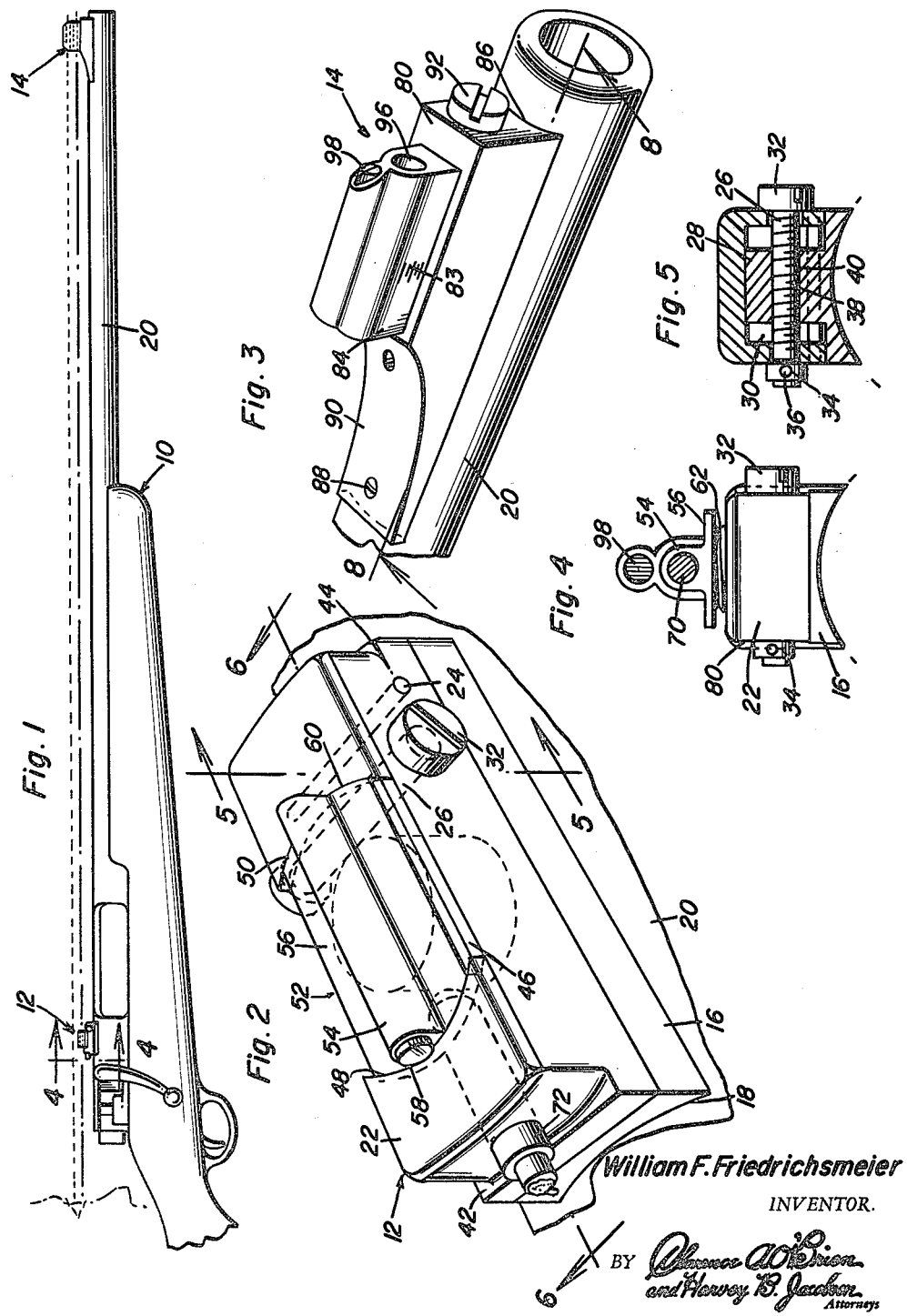
William F. Friedrichsmeier
INVENTOR.

June 8, 1965     W. F. FRIEDRICHSMEIER     3,187,436
CONTRASTING COLOR GUN SIGHT Filed June 1, 1962     2 Sheets-Sheet 2

William F. Friedrichsmeier
INVENTOR.

BY *Clarence A. O'Brien*
*and Harvey B. Jacobson*
Attorneys

United States Patent Office 3,187,436
Patented June 8, 1965

3,187,436
CONTRASTING COLOR GUN SIGHT
William F. Friedrichsmeier, Rte. 1, Wilder, Idaho
Filed June 1, 1962, Ser. No. 199,352
7 Claims. (Cl. 33—52)

The present invention generally relates to guns, and more particularly to novel front and rear gun sights generally used in combination so as to provide a means for rapidly aligning the sights while focusing attention on the target.

One of the primary objects of the present invention involves the use of a contrast of colors as a means for insuring the proper alignment of the gun sights.

Another object of the present invention involves the provision of a colored rear sight positioned so as to align vertically with a colored front sight upon the proper alignment of the gun.

Additionally, an object of the present invention involves the provision of adjustable front and rear sights to correct for elevation and windage.

Also, an object of the present invention is to provide a unique sighting means easily adaptable to all types of guns, whether pistols, rifles or shotguns.

In line with the foregoing objects, the present invention involves the provision of a front sight including two vertically aligned longitudinal passageways with the upper passageway being provided with a colored insert at the forward end thereof, and, a rear sight including a longitudinal passageway having a colored insert at the forward end thereof, the rear sight being aligned with the front sight enabling the user of the gun to position the rear insert in line with the lower passageway of the front sight so that the inserts of both the front and rear sights appear in vertical alignment thereby insuring the absence of any undesirable tilting or canting of the weapon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates a partial side elevational view of a rifle having the sights of the present invention positioned thereon;

FIGURE 2 is an enlarged perspective view of the rear sight of the present invention;

FIGURE 3 is an enlarged perspective view of the front sight of the present invention;

FIGURE 4 is a cross-sectional view taken substantially on a plane passing along line 4—4 in FIGURE 1 showing the correct positioning of the colored inserts so as to insure a properly orientated weapon;

FIGURE 5 is a cross-sectional view taken substantially on a plane passing along line 5—5 in FIGURE 2 and showing the windage adjustment means;

Figure 6:
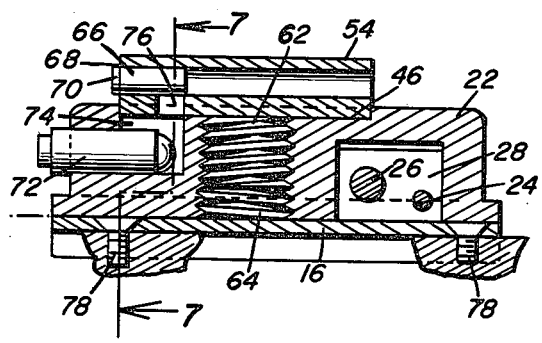
FIGURE 6 is a cross-sectional view taken substantially on a plane passing along line 6—6 in FIGURE 2.

Referring now more particularly to the drawings, reference numeral 10 generally designates a weapon having mounted thereon a rear sight 12 and a front sight 14.

The rear sight 12 consists of an elongated base 16, having a concave lower surface 18 formed so as to conform with the gun barrel 20, and a body portion 22 adjustably mounted on the base 16 by means of a rod 24 and an adjustment bolt 26. Both the rod 24 and the adjustment bolt 26 extend through a projection 28 on the base 16 received within an enlarged opening 30 in the body portion in a manner so as to allow for transverse movement of the body portion 22 relative to the base 16 thereby providing a means for adjusting for windage. The adjustment bolt 26 is provided with a slotted head 32 at one end thereof, a locking collar 34 secured to the other end thereof in any conventional manner such as a setscrew 36, and a threaded central portion 38 adjustably engaged with a threaded bore 40 through the upstanding projection 28 for adjustment thereof. It will also be noted that the body portion 22 can, if so desired, be provided with stepped front and rear faces so as to form shoulders 42 and 44.

The upper surface of the body portion 22 is recessed so as to form an upwardly opening channel 46 provided with concave sides 48 and 50 particularly adapted to receive a rear sighting member 52 comprising an elongated hollow sighting tube 54 and a flat base 56 integrally formed therewith. It will be noted that the flat base 56 is provided with convex ends 58 and 60 adapted to engage the channel sides 48 and 50 in a manner so as to allow rotation of the sighting member 52 by means of a threaded neck 62 engaged within a threaded aperture 64 in the base 22 so as to provide for vertical adjustment between the sighting member 52 and the base 22 thereby insuring the proper elevational alignment of the rear sight 12. As will be appreciated, various interchangeable rear sighting members 52 can be used having different size sighting tubes, different color inserts, and different size inserts, as might be required by different shooting conditions.

Figure 7:
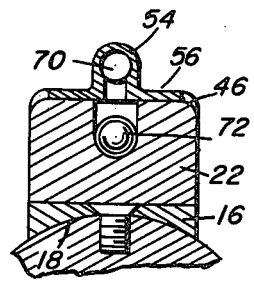
FIGURE 7 is a cross-sectional view taken substantially on a plane passing along line 7—7 in FIGURE 6.
Figure 8:
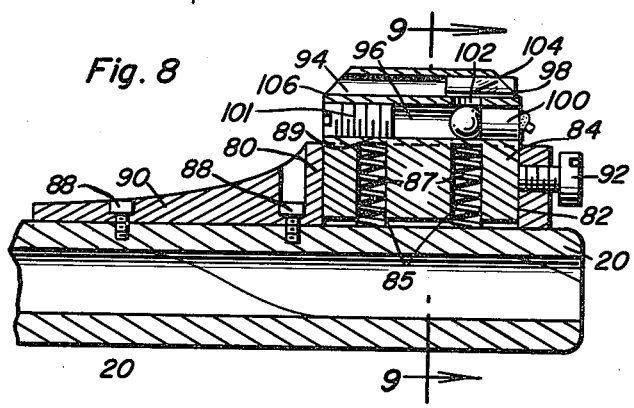
FIGURE 8 is a cross-sectional view taken substantially on a plane passing along line 8—8 in FIGURE 3.
Figure 9:
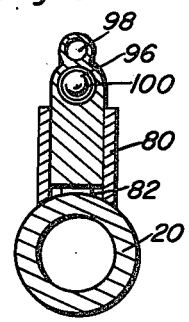
FIGURE 9 is a cross-sectional view taken substantially on a plane passing along line 9—9 in FIGURE 8.

With particularly reference to FIGURES 6 and 7, it will be noted that a translucent insert 66, preferably of plastic, is provided within the forward end of the hollow sighting tube 54 in a manner so as to project slightly beyond the forward end 68 thereof, which projecting portion 70 is particularly provided for the purpose of gathering light so as to illuminate the insert 66. If so desired, an additional source of illumination may be incorporated in the rear sight 12 by the provision of an illuminating means 72 received within an aperture 74 in the forward end of the base 22, which aperture 74 communicates with the insert 66 through a vertical aperture 76. It is contemplated that this auxiliary illuminating means 72 be connected to a source of power in any conventional manner. Further, while the rear sight 12 has been illustrated as being secured by means of screws 78, various other means, such as soldering, can be used within the scope of the present invention.

The front sight 14 consists basically of an elongated base 80 provided with a rectangular vertical aperture 82 therethrough for the purpose of adjustably receiving a front sighting member 84. The base 80, provided with a curved lower surface 86, is secured to the forward end of the barrel 20 by either screws 88 extending through the reduced rear 90, or by soldering. The sighting member 84, fixed in a predetermined vertically adjusted position relative to the base 80 by means of a setscrew 92, can be provided with two vertically extending blind bores 85 containing compression coil springs 87 therein having their lower ends bearing against the gun barrel 20 and the upper ends abutting the closed ends 89 of the bores 85, thereby facilitating the adjustment of the sighting member 84. This sighting member 84 also includes two longitudinally extending passageways 94 and 96, with the upper passageway 94 receiving a translucent colored insert 98 in the forward end thereof. This insert 98 is of a contrasting color to the rear sight insert 66, with the rear insert being preferably green and the front insert being preferably red. As in the ear sight 12, the insert 98 of the front sight 14 is projected slightly beyond the end of the upper passageway 94 so as to gather light for the illumination of the insert 98, both inserts being secured by frictional engagement within the passageways, by threaded engagement, or in any other suitable manner. Also, if deemed necessary, an auxiliary illuminating means 100 may be provided within the forward end of the lower passageway 96, a threaded plug 101 optionally being provided at the other end, with an aperture being formed between the lower passageway 96 and the upper passageway 94, this aperture being referred to by reference numeral 102. It will be noted that the upper passageway 94 is provided with tapered front and rear faces 104 and 106.

It is the intention of the present invention to mount the sights 12 and 14 on a weapon so as to present the arrangement illustrated in FIGURE 4 with the forward illuminated insert appearing directly above and in vertical alignment with the rear illuminated insert of contrasting color upon the proper orientation of the weapon during the use thereof as schematically illustrated in FIGURE 1, vertical adjustment graduations 83 being provided on the member 84 if so desired.

Further, as will be noted from FIGURE 4, the flat upper surface of the body portion 22 on the rear sight 12 is of equal height with the flat upper surface of the elongated base 80 on the front sight 14, the rear sight 12 being slightly narrower than the front sight 14 thus preventing an obstruction of the target by this rear sight.

It will be appreciated that such an arrangement enables the colored insert 98 to appear suspended in air with visibility of the target being provided completely around the insert 98, the lower passageway 96 being horizontally aligned with the sighting tube 54.

FIGURES 10-15 illustrate various modified forms of simplified sights capable of being used in the manner set forth in regard to sights 12 and 14 so as to present a color contrasting means for quickly ascertaining the correct alignment of the weapon.

Figure 10:
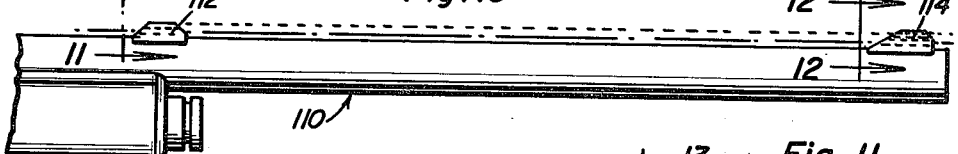
FIGURE 10 is a partial side elevational view illustrating the manner of mounting a pair of modified front and rear sights.
Figure 11:
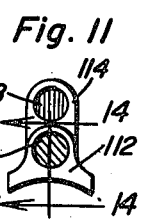
FIGURE 11 is a cross-sectional view taken substantially on a plane passing along line 11—11 in FIGURE 10.

FIGURE 10 illustrates the proper orientation of these sights on a conventional weapon 110. FIGURE 11 illustrates the arrangement of the rear sight 112 and the front sight 114 as viewed from the rear of the weapon 110 upon a proper alignment thereof, the rear sight 112 being provided with a forwardly projecting translucent colored insert 116, and the front sight 114 being provided with a similar insert 118 of a contrasting color.

Figure 13:
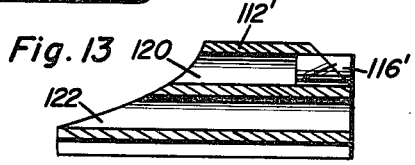
FIGURE 13 is a cross-sectional view illustrating a modified form of rear sight particularly adaptable for use on a plain barrel.
Figure 12:
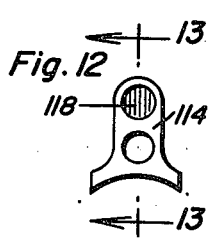
FIGURE 12 is a cross-sectional view taken substantially on a plane passing along line 12—12 in FIGURE 10.

FIGURE 13 illustrates a rear sight 112' provided with two passageways 120 and 122 with the colored insert 116' being provide din the forward end of the upper passageway 120.

Figure 14:
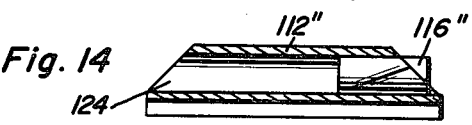
FIGURE 14 illustrates a further modified rear sight particularly adaptable for a ventilated rib.

FIGURE 14 illustrates a further modified form of rear sight 112" particularly adapted for use with a ventilated rib. This rear sight 112" is provided with a single passageway 124 which includes the translucent insert 116" at its forward end.

Figure 15:
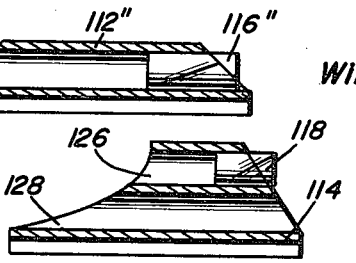
FIGURE 15 is a cross-sectional view illustrating a modified form of front sight particularly adaptable for use with the rear sights illustrated in FIGURES 13 and 14.

FIGURE 15 illustrates the front sight 114 which is usable with either rear sight 112' or 112". This front sight 114 is provided with an upper passageway 126 containing the insert 118 at its forward end, and a lower passageway 128. It will be noted that the front and rear ends of the sights illustrated in FIGURES 10-15 are tapered with the lower surface of these sights being concavely formed so as to conform to the shape of the weapon to which they are secured, preferably by soldering.

From the foregoing, it is considered to be readily apparent that a novel combination of front and rear sights has been devised which, by the use of illuminated contrasting color inserts, has provided a means for enabling the rapid and proper orientation of the weapon while focusing on a target. This illuminated color contrast is provided by the use of translucent front and rear contrasting color inserts each projecting slightly beyond the corresponding sight so as to enable the insert to gather the natural light. Conversely, if so desired, an artificial source of illumination can be provided in both the front and rear sights thereby avoiding the necessity of having to rely on natural light for the illumination of the inserts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A front sight for a firearm comprising a vertical sighting member, said sighting member having a pair of vertically aligned longitudinal passageways extending completely therethrough, and a translucent insert positioned in the forward end of the uppermost passageway, the lowermost passageway being uninterrupted along the full length thereof so as to afford a clear view directly beneath said insert containing uppermost passageway.

2. The device of claim 1 wherein said front sight includes an enlarged base, said base having a vertical aperture extending therethrough, said sighting member being positioned in said aperture and projecting thereabove a distance sufficient so as to locate both passageways above the base, said sighting member being vertically adjustable within said aperture, and means locking said sighting member in a plurality of vertically adjusted positions.

3. The device of claim 2 including spring means located within said aperture, said spring means urging said sight member upwardly so as to facilitate the adjustment thereof.

4. The device of claim 3 in combination with a rear sight comprising a sighting member, said rear sighting member having a longitudinal passageway extending completely therethrough, this rear passageway being substantially axially aligned with the lowermost front passageway, and a translucent insert positioned in the forward end of the rear passageway.

5. The device of claim 1 in combination with a rear sight comprising a sighting member, said rear sighting member having a longitudinal passageway extending completely therethrough, this rear passageway being substantially axially aligned with the lowermost front passageway, and a translucent insert positioned in the forward end of the rear passageway.

6. The device of claim 5 wherein said rear sight is narrower than said front sight.

7. A sighting apparatus for a firearm comprising a front sight and a rear sight mounted on said firearm, said front sight having a pair of vertically aligned longitudinal passageways extending completely therethrough, a translucent insert positioned in the forward end of the uppermost passageway, said rear sight having a longitudinal passageway extending completely therethrough and in substantial axial alignment with the lowermost passageway of the front sight, said rear sight passageway having a translucent insert positioned in the forward end thereof, said inserts appearing in vertical alignment upon a proper orientating of the firearm.

(References on following page)

References Cited by the Examiner
UNITED STATES PATENTS

| | | | |
|---|---|---|---|
| 399,144 | 3/89 | Grenfell | 33—47 |
| 1,088,352 | 2/14 | Teushner | 33—56.5 |
| 1,316,945 | 9/19 | Elliott | 33—58.5 |
| 1,433,422 | 10/22 | Spencer | 33—52 |
| 1,852,875 | 4/32 | Endrezze | 33—52 |
| 2,268,056 | 12/41 | Nelson | 33—47 X |
| 2,356,182 | 8/44 | Schaich | 33—56.5 |
| 2,706,335 | 4/55 | Munsey | 33—47 |
| 2,792,632 | 5/57 | Pinkerton | 33—56 |
| 2,825,137 | 3/58 | Meetin | 33—47 |
| 2,969,594 | 1/61 | Palmer | 33—47 |

ISAAC LISANN, *Primary Examiner.*